United States Patent Office 3,541,584
Patented Nov. 17, 1970

3,541,584
CONTROL FOR FOG SIMULATOR EFFECTS
Arthur Simon, Fair Lawn, Wayne R. Gonzalez, Parsippany, and Charles A. Ankenbrock, Paramus, N.J., assignors to The Bendix Corporation, a corporation of Delaware
Filed Aug. 14, 1968, Ser. No. 752,702
Int. Cl. G09b 9/08
U.S. Cl. 35—12                                    10 Claims

ABSTRACT OF THE DISCLOSURE

Means by which visual sequences which are controlled by a fog simulator can be varied. The visual sequence, when plotted as height versus slant visual range, is called a visibility curve. The visibility curve is initially provided in a number of shapes by the design of individual fog films which are dependent in certain constants of the fog simulator components. By the inclusion of a linear altitude bias control and a ratio altitude bias control in the system, the shape of a visibility curve can be altered to create variation in a predictable and controlled manner. The linear altitude bias control can be employed to correct errors in the fog simulator system caused by error bias in the pitch servo system or in the height-servo-film transport system.

CROSS-REFERENCES TO RELATED APPLICATIONS

The present invention is related to the concepts found in Fog Simulators as disclosed and claimed in copending U.S. application Ser. No. 576,298 filed Aug 31, 1966 by Paul A. Noxon, now U.S. Pat. No. 3,436,840, granted Apr. 8, 1969; copending U.S. application Ser. No. 604,-476 filed Dec. 23, 1966 by Paul A. Noxon, now U.S. Pat. No. 3,427,730, granted Feb. 18, 1969; and copending U.S. application Ser. No. 738,641 filed June 20, 1968 by Simon et al. These patents and applications are assigned to The Bendix Corporation.

BACKGROUND OF THE INVENTION

Field of the invention

The present invention relates to means for simulating atmospheric conditions and, more particularly, to the simulation of fog, as a visual display, as viewed from an aircraft to facilitate the training and testing of aircraft operators by varying the fog pattern so as to approximate visual effect under true fog conditions.

Description of the prior art

A description of the prior art, and the attendant problems to which the present invention is directed are set forth in the aforenoted U.S. Pat. No. 3,436,840 and U.S. Pat. No. 3,427,730, and in the past, in order to change the visual sequences of the fog simulator it was necessary to change the fog films. The present invention provided means for simulating many different approaches which employ one fog film.

SUMMARY OF THE INVENTION

Electronic means for varying the visual sequences of a fog simulator which include a linear altitude bias control and a ratio altitude bias control.

DESCRIPTION OF THE PREFERRED EMBODIMENT

Figure 1:
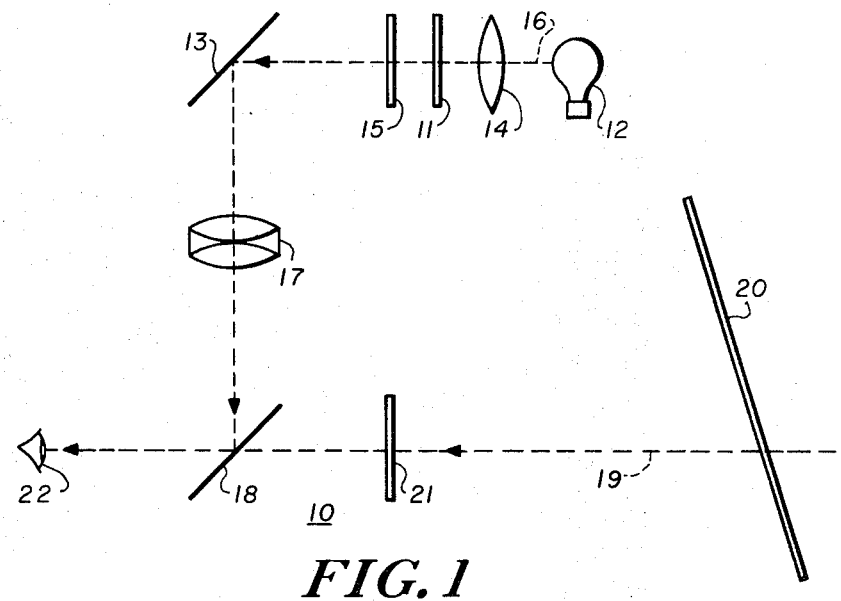
FIG. 1 is a diagrammatical representation of a fog simulator.

Referring now to FIG. 1 of the drawings, a fog simulator is indicated generally by the numeral 10 and is an in-flight training device which would be housed in a head-up display device. The simulator 10 includes a fog film 11 positioned between a lamp 12 and mirror 13. A color correction filter 14 may be positioned between the lamp 12 and the film 11 and a diffuser 15 may be positioned between the film 11 and mirror 13. Light rays come from the lamp 12. Light rays represented by the line 16, modified by the filter 14, film 11 and diffuser 15, impinge upon the mirror 13 which deflects them through a collimator lens 17 onto a combining glass 18. Light rays from the real world, represented by the line 19, pass through a windscreen 20 and attenuator 21 to the combining glass 18. From the combining glass 18, the rays 16 and 19 are viewed by a pilot represented by an eye 22.

The functions of the simulator 10 are to attenuate the view of the real world and to provide a superimposed and collimated fog image. The principle by which visibility is controlled is in the reduction of target to ground contrast ratio. The contrast ratio is expressed mathematically:

(1) $$CR = (B_b - B_t)/B_b$$

where:
$B_b$ = brightness of the background
$B_t$ = brightness of the target.

Attenuation in the fog simulator 10 reduces proportionately the brightness of target and background, but does not alter the contrast ratio. The superimposed fog image, reflected from the combining glass 18, adds luminance to both target and background but causes a reduction in contrast ratio for a corresponding reduction of apparent target brightness. The following example illustrates the concept:

(2) Given:
  Target = 400 foot lamberts
  Background = 800 foot lamberts
  Real world optical path transmittance = .10
  Fog image overlay = 500 foot lamberts $CR = (800 - 400)/800 = 400/800 = .50$ at source
$CR = (800 \times .10) - (400 \times .10)/(800 \times .10)$
   $= (80 - 40)/80 = 40/80 = .50$ at the eye, no overlay
$CR = (80 + 500) - (40 + 500)/(80 + 500) = 50/580 = .068$
   at the eye with overlay.

The real world attenuation is fixed. The luminance of the overlay image is controlled by providing a variable density fog film 11 in the internal optical path. The film 11 acts to vary the vertical distribution of overlay luminance as well as to vary the horizontal distribution so that it is programmed with height. The effect of the variable overlay distribution is to create an illusion of fog, which controls the degree of visibility of the real world by changing the apparent contrast ratios. In a specific example, the film movement is initiated at 500 feet altitude and moves at the average ratio of four inches per 10 feet of height. It is assumed that under all conditions during operation, the visual threshold contrast ratio remains constant. Also the critical contrast ratio value will be assumed to be .05.

Figure 2:
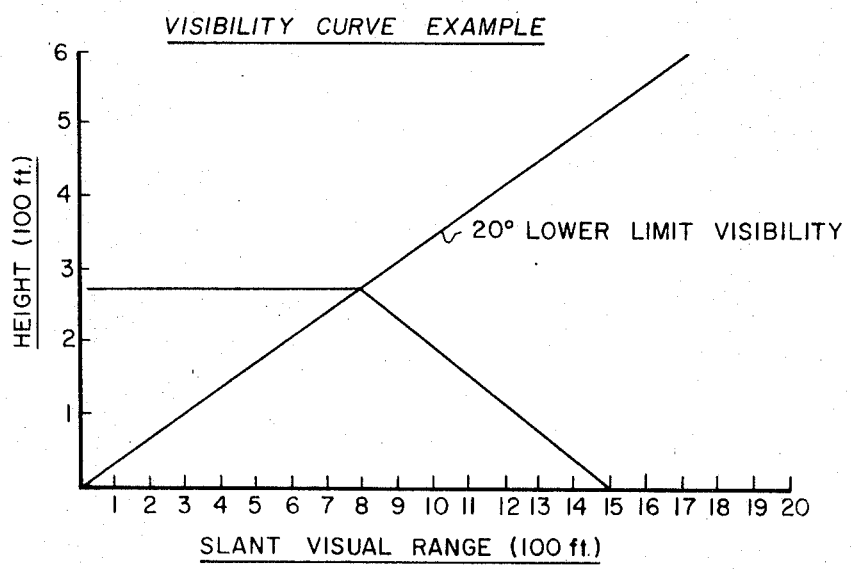
FIG. 2 is an example of a visibility curve.

A visibility curve is a graphic representation of the visual sequence during an approach. The slant visual range describes the maximum distance of visibility from an aircraft to the ground. The plotted sequence of the slant visual range during an approach is illustrated in FIG. 2 as a visibility curve.

Figure 3:
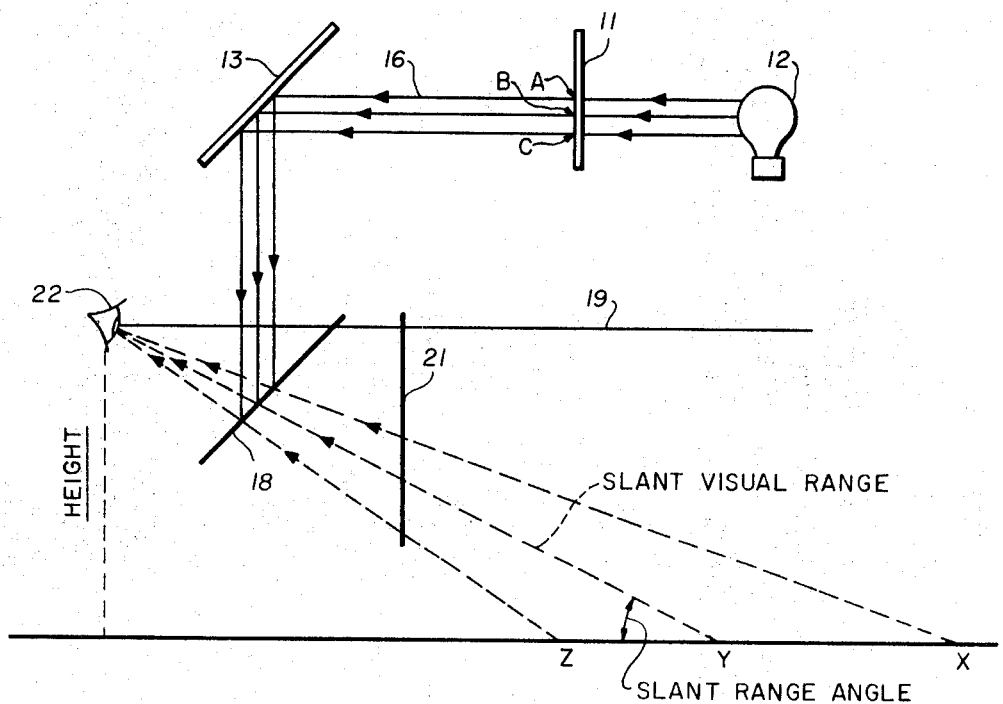
FIG. 3 is a diagrammatical representation illustrating the operation of the fog simulator.

Referring now to FIG. 3 for an illustration of the control of the slant visibility range, the combined effect of overlay brightness controlled by film density at point A, an attenuation of the real world view causes a drop in contrast ratio below that required for visibility, therefore, an object at X would not be visible. The contrast ratio, controlled by the film density at point B is at threshold permitting visibility of objects at Y with only a 50% probability. The film density at point C is higher, thus transmitting even less of the internal lamp 11 brightness causing a decreased overlay brightness on the combining glass 18 which will permit visibility of an object at Z.

The slant visibility range is computed by the equation:

(3) $h/\sin SRA = SVR$
if $h = 500$ ft. and $SRA = 10°$, then
$SVR = 500/\sin 10° = 500/.1736 = 2,880$ ft.

Figure 4:
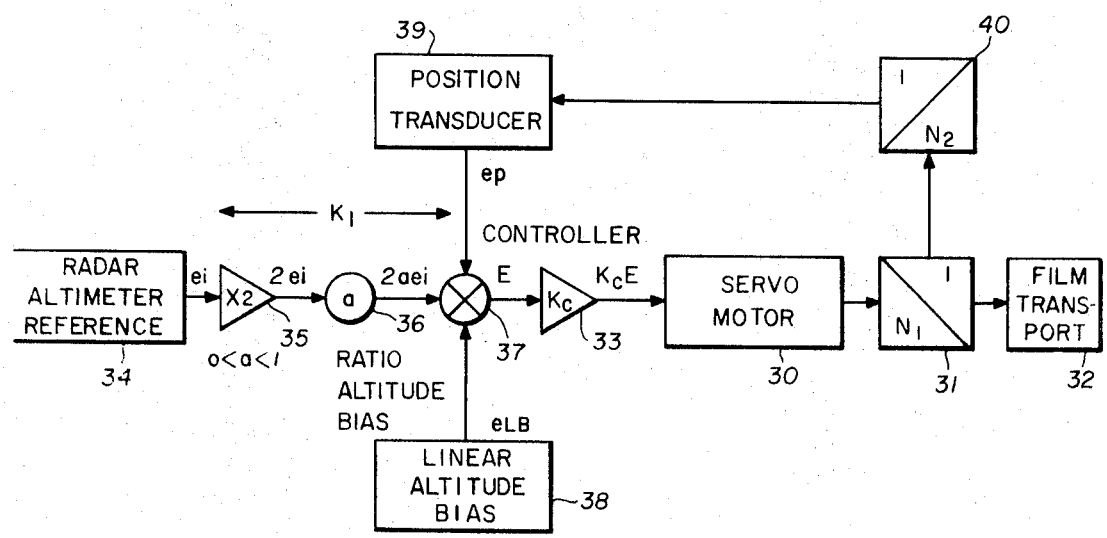
FIG. 4 is a block diagram of a system embodying the invention.

Reference is now made to the block diagram illustrated in FIG. 4 of the drawing for a description of an altitude-servo film transport system. A servomotor 30 is connected by gearing 31 to drive a film transport 32 in accordance with signals from controller 33. A radar altimeter reference 34 is connected by amplifier 35 and ratio altitude bias 36 to a summer 37. Also connected to the summer 37 is linear altitude bias 38 and position transducer 39. The output from the summer 37 is connected to energize the controller 33. The position transducer 39 is driven by the servomotor 30 through gearing 31 and gearing 40.

The position of the glm 11 is determined by an error voltage E, which is a summation of three voltages.

(4) $E = e_p + 2ae_1 + e_{LB}$ where:

$e_p$ = film positioner transducer voltage
$e_1$ = radar altimeter output voltage
$e_{LB}$ = linear altitude bias voltage.

The ratio $a$ is manually set from the ratio altitude bias 36 and has the condition of $0 < a < 1$. As long as E is not at a null, the servomotor 30 is actuated to bring the film position transducer voltage $e_p$ to a value such that KcE is insufficient to provide an output from the servomotor.

The radar altimeter 34 output voltage $e_1$ is a positive linear ramp type waveform and as an example has an amplitude of .10 volts at 500 feet and zero volts at zero altitude. This voltage is multiplied by means of the amplifier 35 which for example has a gain of 2. The output from the amplifier 35 is fed into the ratio altitude bias potentiometer 36 whose ratio $a$, is manually set between 0 and 1. The output from the potentiometer 36 is fed into the summer 37.

The gain $K_1$ for the radar altimeter channel in the altitude servo film throughout is:

(5) $K_1 = K(1 \pm \Delta = 2a$
and
$\Delta = Z(a - \frac{1}{2})$
therefore,
therefore, $K_1 = \frac{2a}{[1 \pm 2(a - \frac{1}{2})]}$ The ratio altitude bias control 36 is calibrated from 0 to 1. From the aforenoted equation, it can be seen that when the control is set to $\frac{1}{2}$, $K_1$ will be 1.0.

The summer 37 also receives an input $e_{LB}$ from the linear altitude bias control 38. This voltage is also positive and has an associated counter readout to show SH (starting height) which can be set between 500 feet and zero feet.

Figure 5:
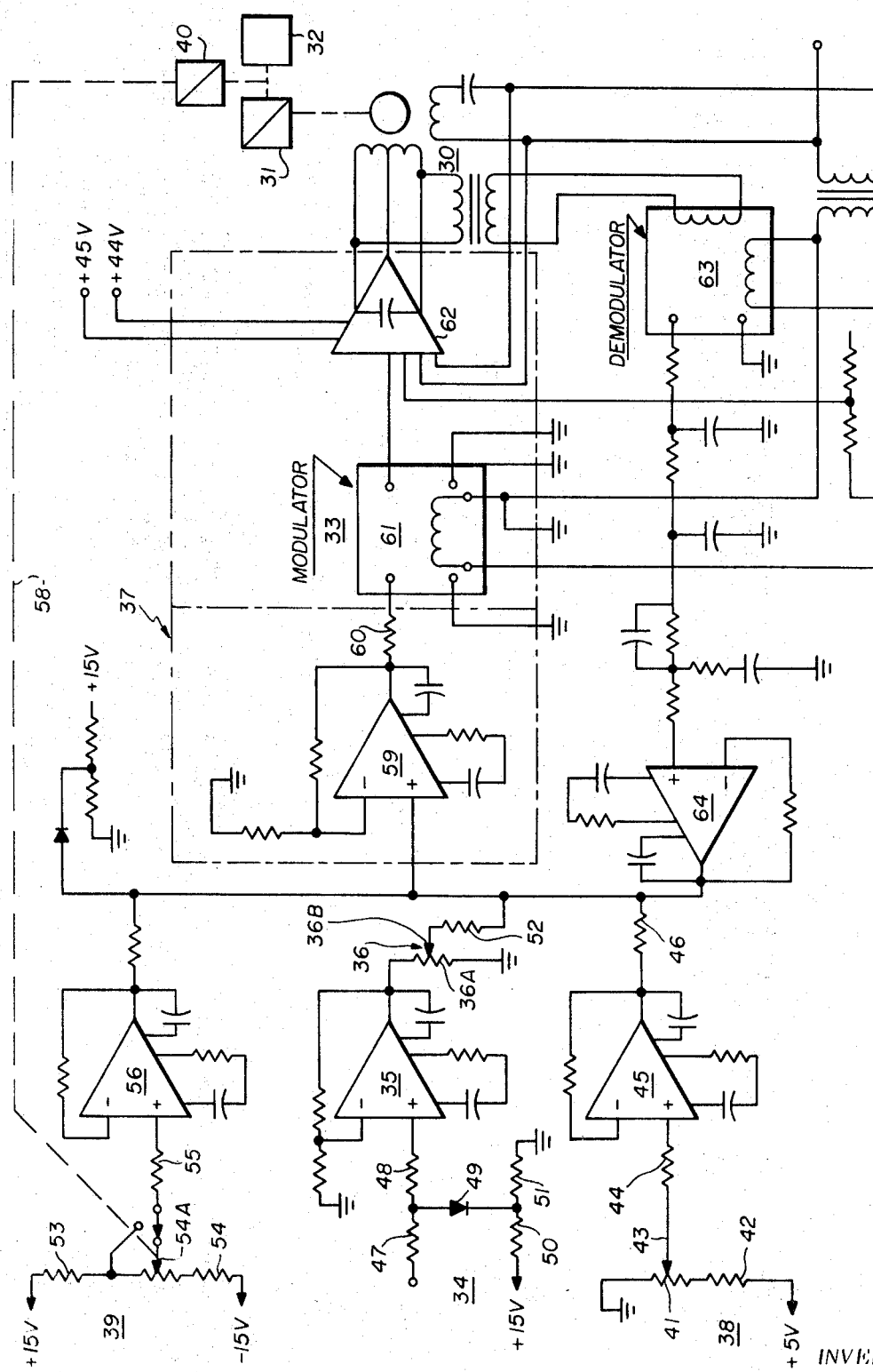
FIG. 5 is a schematic diagram of the system of FIG. 4.

Referring now to FIG. 5 which is a schematic of the system illustrated by the block diagram of FIG. 4 in which the same reference numerals have been assigned to like elements, the linear altitude bias 38 includes potentiometer resistors 41 and 42 connected between a source of +D.C. and ground. The potentiometer resistor 41 has a movable contact 43 connected by resistor 44 to input of amplifier 45, the output of which is connected through resistor 46 to the summer 37.

The radar altimeter reference 34 is connected by resistors 47 and 48 to the input of the amplifier 35. A diode 49 is connected from the midpoint between the resistors 47 and 48 to the midpoint between resistors 50 and 51 which are connected between a source of +DC and ground. The output from the amplifier is connected to the input of the ratio altitude bias 36. The ratio altitude bias 36 includes a resistor 36A having a movable contact 36B which is connected by resistor 52 to the summer 37.

The position transducer 39 includes resistors 53 and 54 connected between a suitable source of D.C. The resistor 54 has a movable contact 54A which is connected by resistor 55 to input of amplifier 56. The output of the amplifier 56 is connected by resistor 57 to the summer 37. The movable contact 54A is actuated by the servo 30 through gearings 31 and 40 as indicated by dashed line 58. The midpoint between the resistors 53 and 54 is connected to a load.

The summer 37 includes a summing amplifier 59 which has its output connected by resistor 60 to the controller 33. The controller 33 includes a modulator 61 and amplifier 62, the output of which is connected to the servo 30. A source of A.C. is connected for energizing the servo 30 and also the modulator 61 and amplifier 62. A feed back path is formed by demodulator 63, associated resistors and amplifier 64 to provide stability in the system. The demodulator 63 is also energized from the source of D.C. and receives a signal from the servo 30. The servo 30 is connected by gearing 31 to drive the film transport 32 in accordance with the signals received from the controller 33.

A change from 500 feet as the starting height SH can be accomplished by an adjustment in the linear altitude bias control 38 (LAB control) or in the ratio altitude bias control 36 (RAB control). In the former, the starting height is delayed until a specific height, thus biasing all points on the film by a constant distance. In the RAB control all points on the film will be presented at a constant proportion of the designated height.

OPERATION

Figure 6:
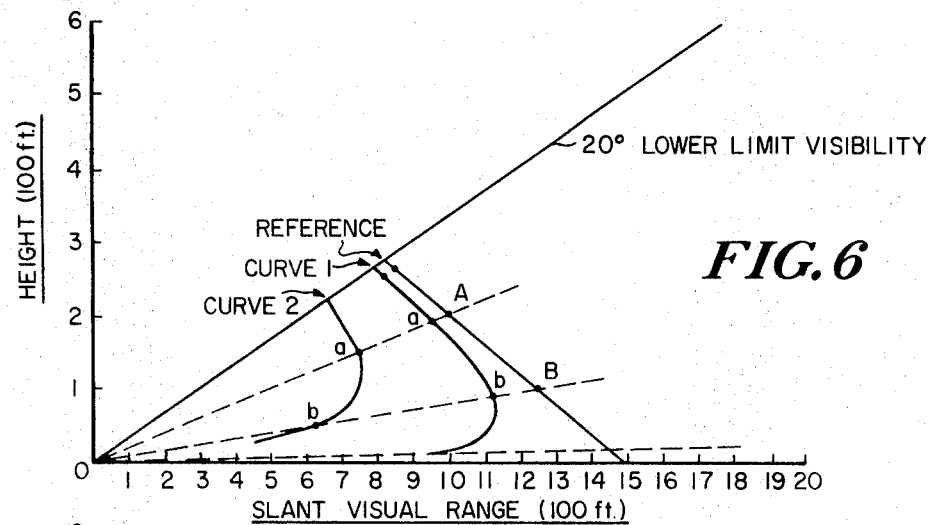
FIGS. 6, 7 and 8 are curves for an explanation of the invention.

In the operation, reference is made to the reference visibility curve illustrated in FIG. 6, which is accomplished by the programmed presentation of the cut-off density in the fog film at the proper SRA (slant range angle) and height. The designed program is predicated on a starting height of 500 feet. By an adjustment of the LAB (linear altitude bias) control 38 to shift the SH (starting height) to 490 feet, the visibility curve will appear as shown by curve 1 of FIG. 6. An additional adjustment to shift SH to 450 feet results in curve 2 of FIG. 6.

The revised shape of the visibility curve can be computed using Equation 2, or a good approximation can be made by graphic means. In FIG. 6, two arbitrary points have been selected on the reference curve. It is understood that any number of points at any position may be selected. A dashed line is drawn from each of these points to the origin. In order to predict the revised shape of the visibility curve from the LAB control bias of −10 feet, each point is shifted along the dashed line to a point which is 10 feet lower on the height scale. The results of shifting several such points is shown by curve 1 of FIG. 6. Curve 2 of FIG. 6 is similar but the points are shifted on the height scale by 50 feet. Each such point represents the cut-off density on the fog film at a linearly designated position. Its presentation at the new height creates the corresponding new SVR.

Further flexibility is given the fog simulator by the ratio bias control 36 which can shift the visibility curve to a different height yet enabling it to retain its shape.

Figure 7:
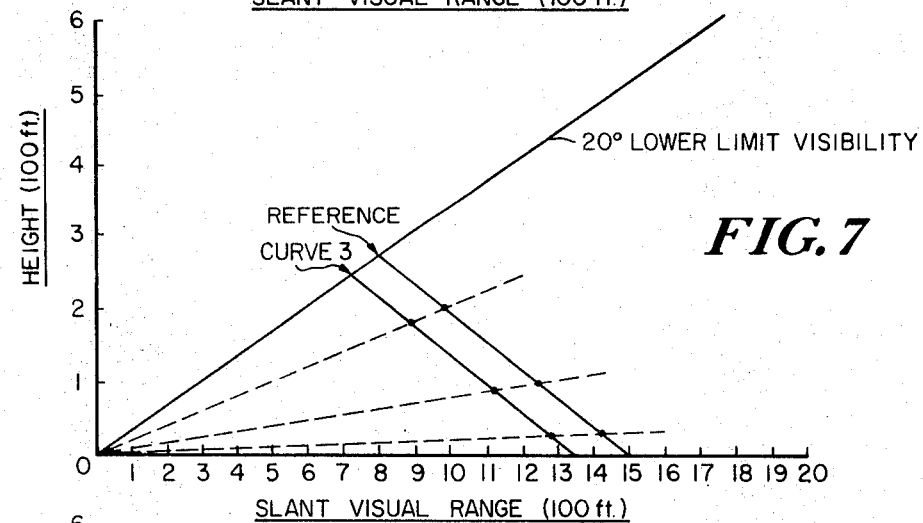

Referring now to FIG. 7 which presents the same reference curve as shown in FIG. 6, the curve 3 indicates the change caused by a ratio adjustment of the ratio bias control 36 to 0.9. The prediction of the revised curve 3 may again be computed from the Equation 2, or by using the graphic method. For the later method, dashed lines are drawn from any number of selected points on the reference curve to the origin. Each of these points is shifted along the line to a height which corresponds to the degree of bias, in this example 0.9 or 90% of the referenced height.

Thus, means are provided for simulating many different approaches while employing one fog film. This represents an advantage in that it does not require additional fog films. Further variable sequences can be presented to a pilot in training while on a single flight.

Figure 8:
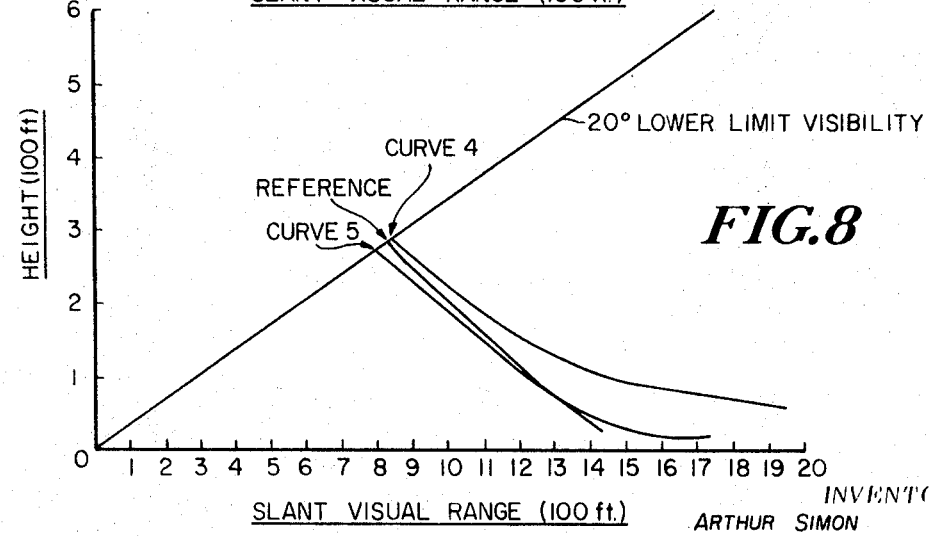

Systematic errors may occur in the fog simulator presentation due either to the height servo mechanism or to the pitch-servo mechanism. If the height-servo system is in error such that film movement is initiated at 510 feet, while directed to start at 500 feet, the LAB (linear altitude bias) control 38 can be used to introduce a bias of −10 feet, thus accomplishing an accurate starting height at 500 feet. An error in the pitch-servo system of, for example, 30 minutes causes a shift of the reference curve as illustrated by curve 4 in FIG. 8. The LAB (linear altitude bias) control 38 can again be utilized to compensate to a close approximation of the original visibility curve 5 of FIG. 8 illustrates the results of a −10 foot correction.

Although only one embodiment of the invention has been illustrated and described, various changes in the form and relative arrangement of the parts which will now appear to those skilled in the art may be made without departing from the scope of the invention.

What is claimed is:

1. In a fog simulator system, a height servo film transport comprising a fog film having a predetermined variable visual sequence effect, means to transport the fog film, servo means for driving the fog film transport means to vary the position of the film and thereby the visual effect of said fog film, a film position transducer driven by said servo means and having a first output voltage in accordance with the position of said fog film, an altitude reference means having a second output voltage in accordance with a sensed altitude condition, linear altitude bias means including means variable to provide third predetermined output voltages, means for summing said first, second and third output voltages, a controller having an input and an output, means connecting said summer voltages to the input of said controller, and means operatively connecting the output of said controller to said servo means to cause said servo means to drive the film transport means to vary the position of said fog film in accordance with said summed voltages.

2. The combination as set forth in claim 1 in which the variable means of said linear altitude bias means effectively shifts the starting height of said fog film and thereby the visibility sequence of said fog film.

3. The combination as set forth in claim 2 in which the variable means of said linear altitude bias means is a potentiometer.

4. The combination as set forth in claim 2 in which varying said linear altitude bias means by said variable means simulates different approaches from said fog film.

5. The combination as set forth in claim 1 and including a ratio bias control connected to change the ratio of the altitude reference voltage.

6. The combination as set forth in claim 5 in which said ratio bias control is a potentiometer.

7. The combination as set forth in claim 5 in which changes in ratio by said ratio bias control causes the visual sequence of said fog film to appear at different heights.

8. The combination as set forth in claim 1 in which the visual sequence of said fog film when plotted as height versus slant visual range provides a predetermined visibility curve.

9. The combination as set forth in claim 8 in which said linear bias control means includes the variable means for altering the shape of said visibility curve.

10. The combination as set forth in claim 8 in which said ratio bias control provides means for shifting the position of said visibility curve.

References Cited

UNITED STATES PATENTS

| | | | |
|---|---|---|---|
| 3,427,730 | 2/1969 | Noxon | 35—12 |
| 3,436,840 | 4/1969 | Noxon | 35—12 |

PAUL V. WILLIAMS, Primary Examiner